United States Patent

Yoshiba

[11] Patent Number: 5,162,024
[45] Date of Patent: Nov. 10, 1992

[54] ROTATIONAL SPEED DIFFERENTIAL RESPONSIVE TYPE CONTROL COUPLING

[75] Inventor: Hiroshi Yoshiba, Kanagawa, Japan

[73] Assignee: Nissan Motor Co., Ltd., Yokohama, Japan

[21] Appl. No.: 703,515

[22] Filed: May 21, 1991

[30] Foreign Application Priority Data

May 21, 1990 [JP] Japan .................. 2-130542

[51] Int. Cl.$^5$ .................. F16H 1/44; F16H 1/445; F16D 31/02
[52] U.S. Cl. .................. 475/89; 475/88; 475/90; 192/60
[58] Field of Search .................. 475/84, 86, 88, 89, 475/90; 192/60

[56] References Cited

U.S. PATENT DOCUMENTS

| 2,207,310 | 7/1940 | Ballamy | 475/89 |
|---|---|---|---|
| 2,922,319 | 1/1960 | Burner | 475/90 |
| 3,089,349 | 5/1963 | Thornton | 475/89 |
| 3,229,794 | 1/1966 | Fraser | 192/60 |
| 3,232,139 | 2/1966 | Nickell | 475/90 X |
| 3,393,582 | 7/1968 | Mueller | 475/89 |
| 3,393,583 | 7/1968 | Mueller | 475/89 |
| 3,577,803 | 5/1971 | Mueller | 192/60 X |
| 4,727,966 | 3/1988 | Hiramatsu et al. | 475/88 X |
| 4,829,769 | 5/1989 | Hiramatsu | 192/60 X |
| 4,867,012 | 9/1989 | McGarraugh | 475/90 X |
| 4,916,973 | 4/1990 | Fuelberth et al. | 475/89 X |
| 4,921,085 | 5/1990 | Takemura et al. | 192/60 |
| 4,957,473 | 9/1990 | Takemura et al. | 192/60 X |
| 4,958,711 | 9/1990 | Okubo et al. | 192/60 |
| 4,980,521 | 12/1990 | Hiramatsu et al. | 192/60 |
| 5,024,309 | 6/1991 | Takemura et al. | 192/60 |

FOREIGN PATENT DOCUMENTS

| 3536578 | 4/1986 | Fed. Rep. of Germany | 475/88 |
|---|---|---|---|
| 3720280 | 1/1988 | Fed. Rep. of Germany | 475/88 |
| 63-62635 | 4/1988 | Japan . | |

Primary Examiner—Leslie A. Braun
Assistant Examiner—David E. Henn
Attorney, Agent, or Firm—Pennie & Edmonds

[57] ABSTRACT

In a rotational speed differential responsive type control coupling, restrictions of a fixed opening are provided for restricting discharge of oil through discharge passages and thereby producing an oil pressure for urging relative rotatable coupling members against each other. By-pass passages are provided for by-passing the restrictions and thereby preventing production of the oil pressure for urge of the coupling members. The by-pass passages are selectively opened and closed by means of a control valve.

13 Claims, 4 Drawing Sheets

ROTATIONAL SPEED DIFFERENTIAL RESPONSIVE TYPE CONTROL COUPLING

BACKGROUND OF THE INVENTION

1. Field of the Invention

The present invention relates to hydraulic torque transmitting couplings and more particularly to control couplings of the rotational speed differential responsive type used as a driving torque distributing device, a differential slip limiting device, etc. in a multi-wheel drive vehicle such as a four-wheel drive vehicle.

2. Description of the Prior Art

An example of a prior art rotational speed differential responsive type control coupling is disclosed in Japanese Patent Provisional Publication No. 63-62635.

This control coupling includes concentric inner and outer rotary members, a fluid passage through which fluid flows in response to a relative rotation between the rotary members and an orifice disposed in the fluid passage for restricting fluid flow therethrough and thereby restricting relative rotation between the rotary members.

Since the orifice is not variable but fixed in opening irrespective of a vehicle running condition, the vehicle with such a control coupling cannot attain a desired driving stability and a desired steering characteristic under some particular running conditions, e.g., running with laterally opposed vehicle wheels being in engagement with road surfaces of largely different frictional resistances or running at an extremely low atmospheric temperature.

In order to solve the above problem, it has been proposed to utilize a variable orifice which is fully opened under the above described particular running conditions and partly closed to effect a restricted flow passage under a normal running condition. However, the orifice opening under a normal running condition is liable to vary due to a variation of hydraulic pressure to which it is subjected, resulting in a deteriorated control stability. Further, there has been design problems such as difficulties in attaining the fluid tightness of the variable orifice, determining the disposition of an actuator for the variable orifice, etc.

SUMMARY OF THE INVENTION

In accordance with the present invention, there is provided a novel and improved control coupling which comprises a first rotary member, a second rotary member disposed concentrically within the first rotary member, oil discharge means responsive to a rotational speed differential between the first and second rotary members for discharging a quantity of oil proportional to the rotational speed differential, restriction means for restricting discharge of oil by the oil discharge means and thereby producing an oil pressure for urging one of the first and second rotary members against the other, by-pass passage means for by-passing the restriction means and thereby releasing the discharge means from confinement by the restriction means, and control valve means for selectively opening and closing the by-pass passage means.

The above structure is effective for solving the above noted problems inherent in the prior art device.

It is accordingly an object of the present invention to provide a novel and improved rotational speed differential responsive type control coupling which can assuredly prevent transmission of torque therethrough irrespective of a rotational speed differential between associated rotating members under a predetermined particular condition, while being capable of attaining a stable torque transmitting characteristic in response to a rotational speed differential under a predetermined normal condition.

It is a further object of the present invention to provide a novel and improved rotational speed differential control coupling which is useful as a differential slip limiting device in a front, rear or center differential and driving force distributing device for a vehicle for attaining a driving stability and therefore a safety driving of a vehicle.

DETAILED DESCRIPTION OF THE PREFERRED EMBODIMENT

Figure 1:
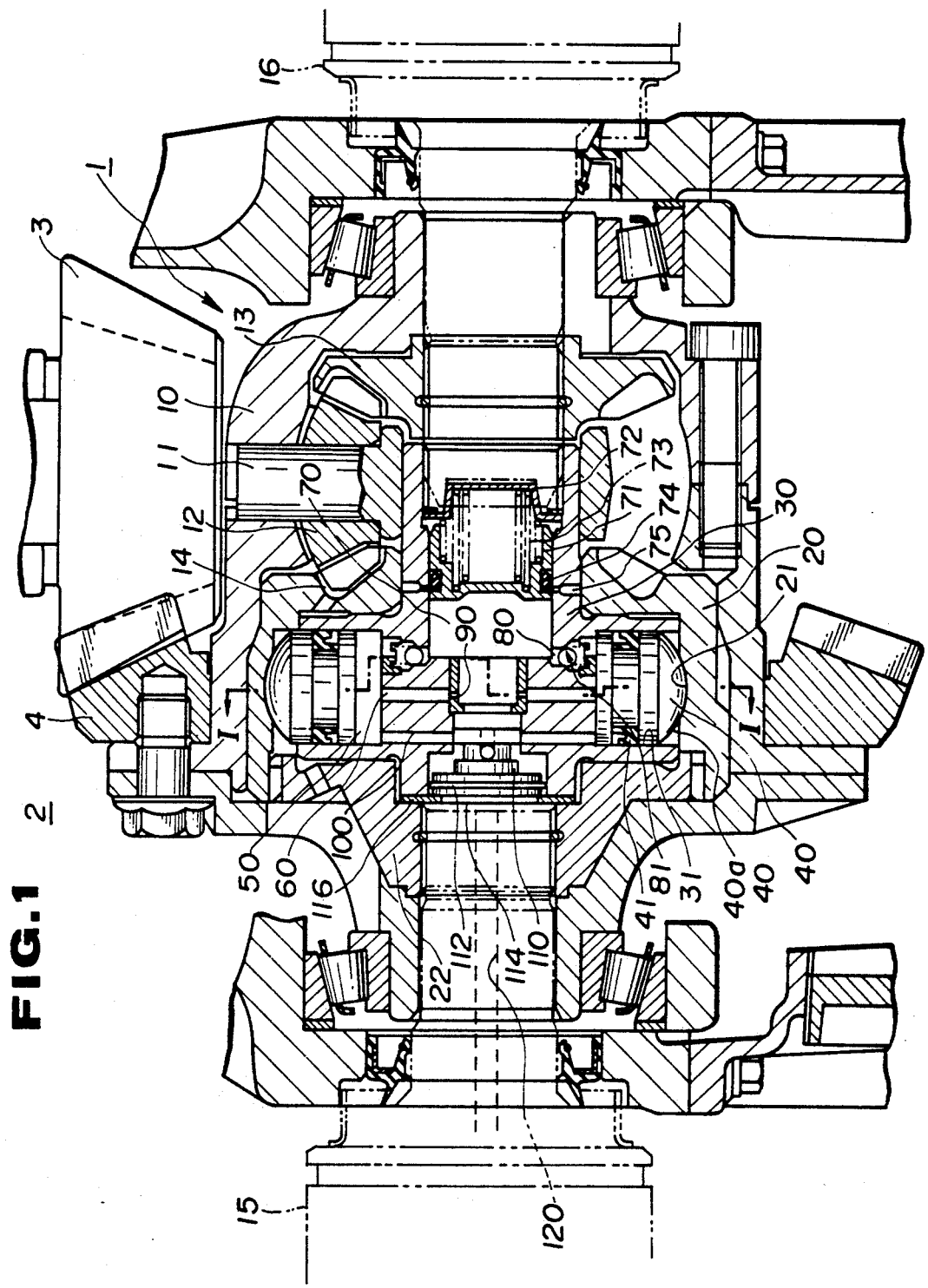
FIG. 1 is a sectional view of a limited slip differential unit incorporating a rotational speed differential responsive type control coupling according to the present invention.
Figure 2:
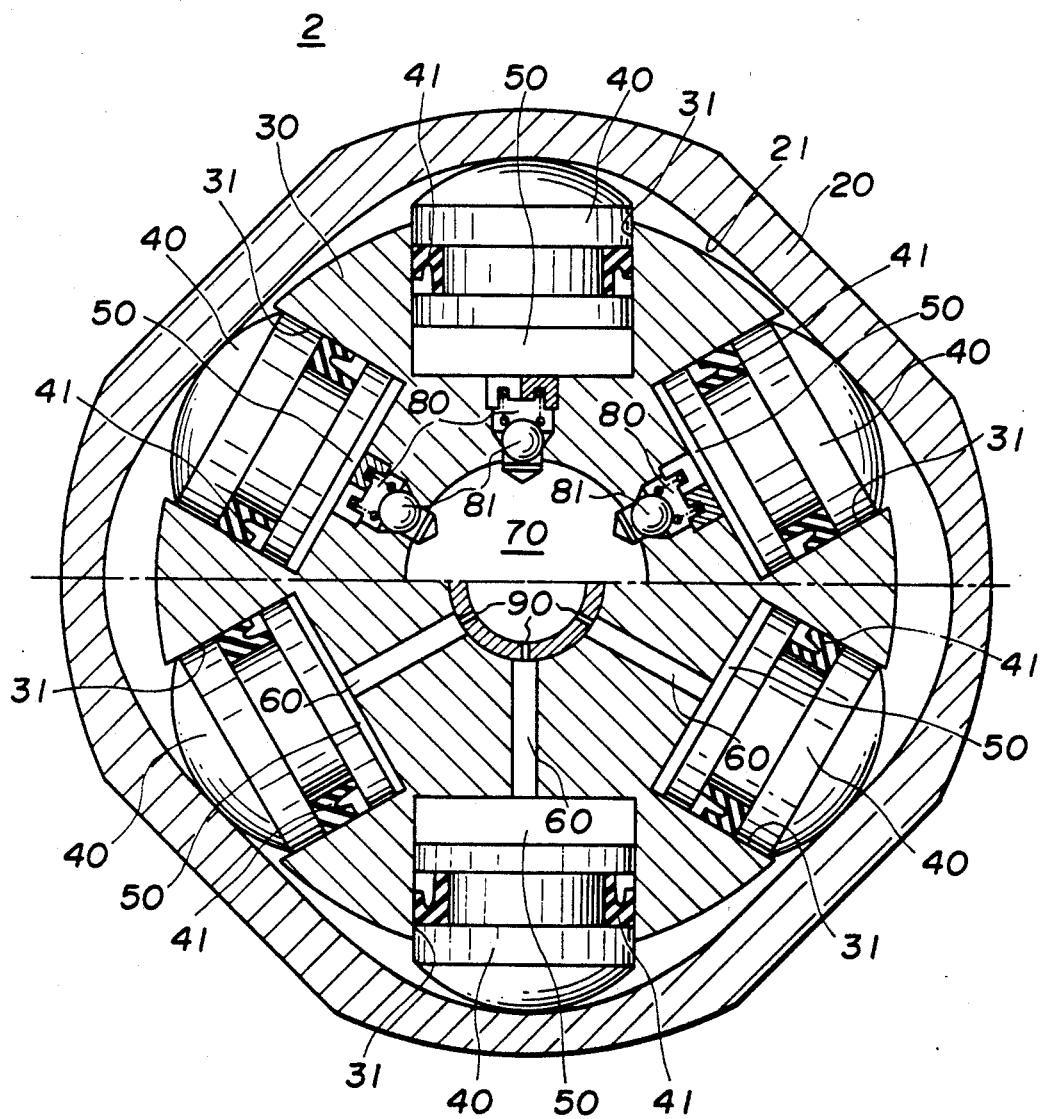
FIG. 2 is a sectional view taken along the line I—I of FIG. 1.

Referring to FIGS. 1 to 4 inclusive, a limited slip differential unit is generally indicated by 1 and incorporates therein a rotational speed differential responsive type control coupling 2 according to an embodiment of this invention.

The differential unit 1 includes a driving member in the form of a differential casing 10 which is rotatable about an axis, and two driven members in the form of axle shafts 15 and 16 extending in the opposite outward directions from the casing 10 generally along the axis which the casing 10 is rotatable about. An input gear 3 meshes with a ring gear 4 which is bolted to the casing 10. A pinion carrier 11 is mounted in the casing 10 for rotation therewith and rotatably carries a pinion 12. A pair of side gears 13 and 14 are splined to the axle shafts 16 and 15, respectively.

In order to restrain the rotational speed differential between the axle shafts 15 and 16, there is provided the rotational speed differential responsive type control coupling 2 which comprises a first rotary element in the form of a cam ring 20 formed with a rise and fall cam surface 21. The cam ring 20 is splined to a hub 22 which is in turn splined to the axle shaft 15. Surrounded by the cam ring 20 is a second rotary element in the form of a rotor 30. The rotor 30 is drivingly connected to the axle shaft 16 and therefore the side gear 13 to rotate therewith, i.e., the axle shaft 16 is splined to the side gear 13 and extends further inwardly of the casing 10 into a central opening of the carrier 11 and is splined to the rotor 30. By this, an input torque transmitted to the differential casing 10 via the input gear 3 and the ring gear 4 is transmitted on one hand to the axle shaft 16 via the pinion 12 and the side gear 13, and on the other hand to the axle shaft 15 via the pinion 12, side gear 14, cam ring 20 and splined hub 22.

When a rotational speed differential occurs between the axle shafts 15 and 16, a torque is transmitted via an oil discharge means which is hereinafter described.

The oil discharge means includes the rise and fall cam surface 21, six cylinders 31 formed in the rotor 20 (see FIG. 2), and six pistons 40 positioned in the respective cylinders 31. Each piston 40 has a seal ring 41 to define a pressure chamber 50. More specifically, the cylinders 31 are in the form of radial holes having open radially outward ends where they face the cam surface 21. The pistons 40 have spherically rounded tops 40a where they are brought into contact with the cam surface 21.

The oil discharge means further includes a discharge passage means. As best seen from FIG. 2, the discharge passage means includes six radial discharge passages 60 formed in the rotor 30 to extend between the respective pressure chambers 50 and an accumulator chamber 70 for providing communication therebetween. However, fluid communication between the accumulator chamber 70 and the pressure chambers 50 are restricted at orifices 90. The orifices 90 are not variable in size but each have a fixed diameter and are disposed at the junction between the discharge passages 60 and the accumulator chamber 70 to restrict fluid communication therebetween.

Each pressure chamber 50 is communicates with a ball check valve 81 having a radial passage 80 extending between the respective pressure chambers 50 and the accumulator chamber 70 to provide communication therebetween. With these ball check valves 81, discharge of hydraulic fluid from the pressure chambers 50 is prevented although supply of hydraulic fluid thereto is allowed. The ball check valves 81 thus constitute a regulator passage means for regulating the pressure within the pressure chambers 50.

The accumulator chamber 70 is formed from a central or concentric opening of the rotor 30 and has opposite axial ends which are sealingly closed by an accumulator piston 71 and a valve spool 110 which are slidably installed in the accumulator chamber 70. The piston 71 has a seal ring 74 while the valve spool 110 has a seal ring 112 for defining the accumulator chamber 70. The rotor 30 is formed with radial relief passages 75 which cooperate with the seal ring 74 to constitute a relief valve for preventing the pressure within the accumulator chamber 70 from becoming higher than a predetermined value. The accumulator piston 71 is biased toward the valve spool 110 by an accumulator spring 73 in the form of a dual spring assembly. The accumulator spring 73 is operatively disposed between the accumulator piston 71 and a spring retainer ring 72 fixed to the rotor 30.

Figure 3:
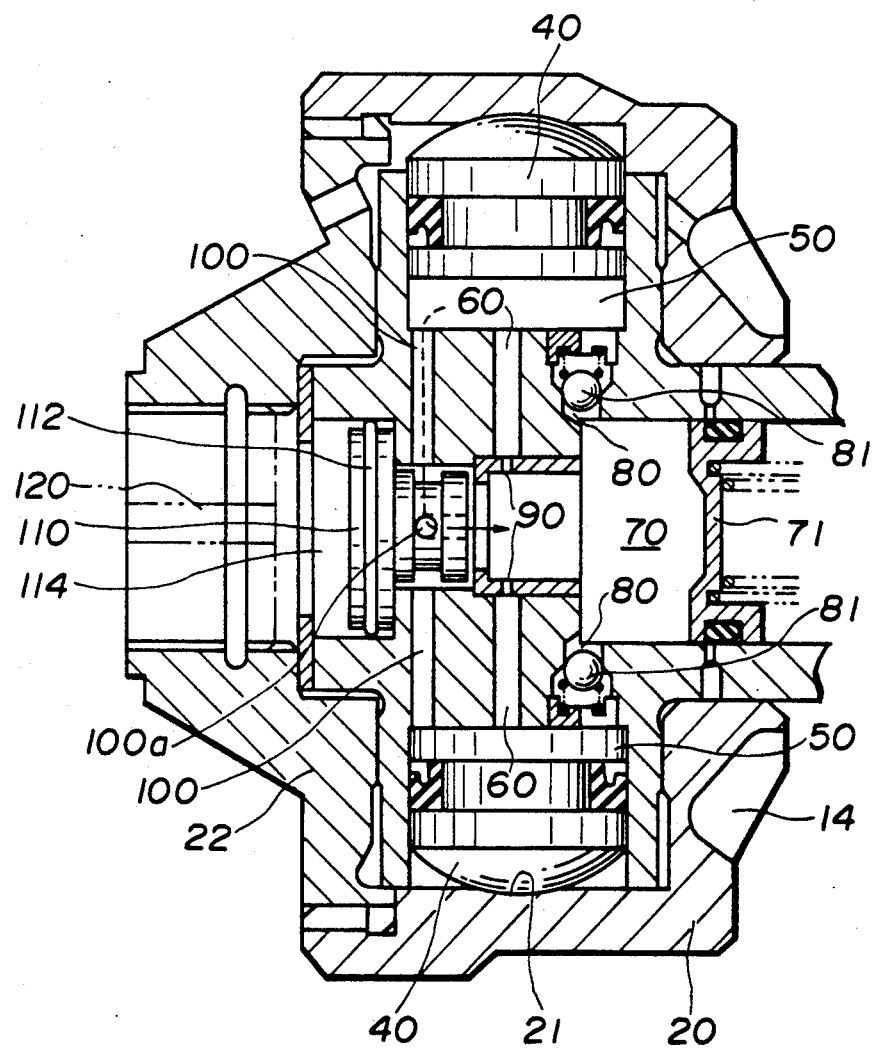
FIG. 3 is an enlarged sectional view of the rotational speed differential responsive type control coupling of FIG. 1.

By-pass passage means is provided which includes six by-pass passages 100 in parallel relation to the respective discharge passages 60. The by-pass passages 100 are provided for by-passing the restrictions 90 and the discharge passages 60 and providing communication between the respective pressure chambers 50 and the accumulator chamber 70. The valve spool 110 is axially movably installed in the accumulator chamber 70 to move between a leftmost position for fully closing the inner ends of the by-pass passages 100 as shown in FIG. 1 and a rightmost position for fully opening the inner ends of the by-pass passages 100 and communicating the same with the accumulator chamber 70 through a passage 110a as shown in FIG. 3. In this connection, the valve spool 110 is exposed at an axially inner end to the oil pressure in the accumulator chamber 70 and at an axially outer end to an oil pressure in a control oil pressure chamber 114, which oil pressure is supplied to the control oil pressure chamber 114 through an control oil pressure passage 120. The spool valve 110 is moved into the leftmost position and held stationarily thereat, being urged by the oil pressure in the accumulator chamber 70 when the control oil pressure chamber 114 is drained. A stopper 116 is fixedly installed on the rotor 30 to abut upon the valve spool 110 for thereby assuredly holding the valve spool 110 at the leftmost position. The valve spool 110 is moved into the rightmost position and held stationarily thereat, being urged by the oil pressure in the control oil pressure chamber 114 while prevailing the oil pressure in the accumulator chamber 70. In this instance, the valve spool 110 and the rotor 30 have mating shoulders to abut upon each other for thereby assuredly holding the valve spool 110 at the rightmost position.

The operation is now described hereinbelow.

During normal running:

Pressurized oil is not supplied to the control oil pressure chamber 114 through the control oil pressure passage 120 during normal running, thus causing the valve spool 110 to be held stationarily at the leftmost position and thereby close the inner ends of the by-pass passages 100 as shown in FIG. 1.

When a rotational speed differential occurs between left and right wheels of an associated vehicle and therefore a relative rotation is caused between the axle shafts 15 and 16, this relative rotation causes the pistons 40 to reciprocate since they slide on the rise and fall cam surface 21. When the pistons 40 reciprocate, oil is discharged from the pressure chambers 50 to flow through the discharge passages 60 into the accumulator chamber 70 on the discharge strokes of the associated pistons 40 under the flow restriction provided by the orifices 90. Owing to the flow restriction provided by the orifices 90, a pressure increase occurs in each of the pressure chambers 50 on the discharge strokes of the pistons 50. This pressure increase urges the associated pistons 40 into firm engagement with the rise and fall cam surface 21. When a pressure drop occurs in the pressure chambers 50 during their suction strokes, hydraulic fluid in the accumulator chamber 70 is supplied to the pressure chambers 50 by way of the ball check valves 81. As a result, a portion of torque directly transmitted from the cam ring 20 to the rotor 30 increases as the rotational speed differential increases. Thus, the differential slip is limited in accordance with the torque transmitted from the cam ring 20 to the rotor 30. This torque is called a differential slip limiting torque.

Figure 4:
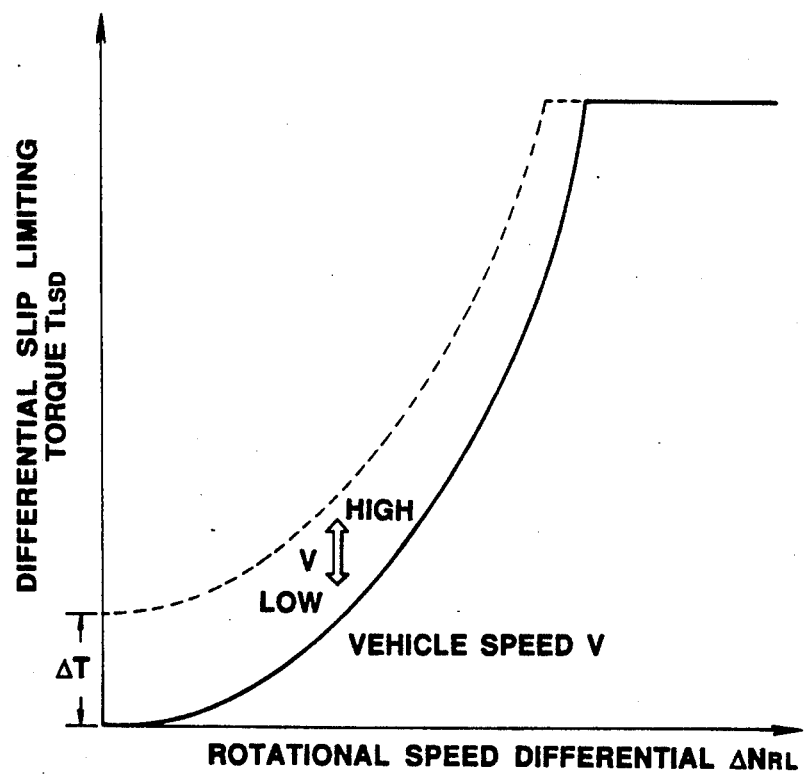
FIG. 4 is a graph depicting the torque transmitting characteristic of the control coupling of FIG. 1.

As shown in FIG. 4, a differential slip limiting torque $T_{LSD}$ increases along a curve of secondary order as a rotational speed differential $\Delta N_{RL}$ increases.

Accordingly, it becomes possible to improve a vehicle's ability of running through a rough terrain and a vehicle's ability of getting out of a muddy or sandy place since a high rotational speed differential $\Delta N_{RL}$ occurs under such running conditions and therefore a large slip limiting torque $T_{LSD}$ is produced to prevent the differential slip.

In the meantime, when the vehicle is running at a high speed V, the pistons 40 are subjected to a large centrifugal force and thereby pressed against the cam surface 21. Accordingly, a certain slip limiting torque is produced in response to a high vehicle speed V, thus increasing an overall slip limiting torque as represented by the dotted line curve as shown in FIG. 4 and therefore making it possible to improve the straight running stability on a highway, etc.

At the time of running in which a differential slip limiting torque is unnecessary:

At the time in which a differential slip limiting torque is unnecessary, such as the time in which an anti-skid braking system is in operation or the atmospheric temperature is extremely low, pressurized oil is supplied through the control oil pressure passage 120 to the control oil pressure chamber 114 at the outer axial end of the valve spool 110, thus causing the valve spool 110 to be held stationarily at the rightmost position as shown in FIG. 3 for thereby opening the inner ends of the by-pass passages 100.

In this connection, the pressurized oil to be supplied to the control oil pressure chamber 114 may be drawn thereto from the anti-skid braking system when the braking system is in operation or pressurized oil in another source may be supplied to the control oil pressure passage 120 when a signal from a controller of the anti-skid braking system indicates that the anti-skid braking system is in operation or when a signal from a sensor indicates that the atmospheric temperature is extremely low, i.e., lower than a predetermined value.

Accordingly, when a relative rotation between the axle shafts 15 and 16 causes the pistons 40 to reciprocate, oil is discharged from the pressure chambers 50 and supplied through the by-pass passages 100 to the accumulator chamber 70 on the discharge strokes of the pistons 40. In this instance, since the by-pass passages 100 are small in flow resistance, a large increase of oil pressure is not caused in the pressure chambers 50 and therefore a differential slip limiting torque is maintained at a small value.

As a result, when the vehicle is braked under a condition in which one of the two driving wheels is in contact with a paved road surface of a higher frictional resistance and the other is in contact with an icy road surface of a lower frictional resistance, or when the anti-skid braking system is operational, a large rotational speed differential is allowed between the left and right wheels. This is effective for attaining a driving stability under such a condition.

When the atmospheric temperature is extremely low, the viscosity of oil becomes extremely high. However, since oil can flow through the by-pass passages 100 of a small flow resistance into the accumulator chamber 70, the slip limiting torque can be maintained at a small value, thus enabling the vehicle to understeer during cornering and making it possible to prevent spinning of the vehicle when the vehicle is braked during cornering on a low-$\mu$ road.

While the present invention has been described and shown as being a rotational speed differential responsive type control coupling of a differential unit, this is not limitative but can be a differential slip limiting device of a center differential unit for producing a slip limiting torque in accordance with a rotational speed differential $\Delta N_{FR}$ between the front and rear wheels or a driving force distributing device for distributing power to front and rear wheels in accordance with a rotational speed differential $\Delta N_{FR}$ between the front and rear wheels.

What is claimed is:

1. A control coupling comprising a first rotary member; a second rotary member disposed concentrically within said first rotary member; and means for transmitting torque from one of said first and second rotary members to the other in response to a rotational speed differential between said first and second rotary members, said torque transmitting means comprising:
    a cam surface formed in said first rotary member;
    a plurality of radially movable pistons mounted in said second rotary member and engaging said cam surface;
    oil discharge means responsive to a rotational speed differential between said first and second rotary members for discharging a quantity of oil proportional to said rotational speed differential, said oil discharge means having a plurality oil discharge passages formed in said second rotary member for discharging said quantity of oil therethrough;
    restriction means having a plurality of orifices each fixed in size for restricting discharge of oil through said respective discharge passages and thereby producing an oil pressure for urging said pistons into engagement with said cam surface to thereby transmit torque;
    by-pass passage means having a plurality of by-pass passages independent of said discharge ;passages and formed in said second rotary member for by-passing said discharge passages and said orifices, respectively and thereby releasing the oil pressure produced by said orifices; and
    control valve means for selectively opening and closing said by-pass passages.

2. A control coupling according to claim 1, wherein a plurality of pressure chambers are defined between said second rotary member and said pistons, said chambers being variable in volume in response to movement of said pistons, said discharge passages communicating with said pressure chambers, said discharge passages being formed parallel and non-concentric with said by-pass passages.

3. A control coupling according to claim 2, further comprising accumulator means for storing oil discharged from said pressure chamber on discharge strokes of said pistons and supplying oil to said pressure chambers on suction strokes of said pistons, said accumulator means having an accumulator chamber communicating with said pressure chambers through said discharge passages and said by-pass passages.

4. A control coupling according to claim 3, wherein said accumulator chamber is disposed at a center of said second rotary member, and said discharge passages and said by-pass passages extend radially of said second rotary member to have radially inner ends connected with said accumulator chamber and radially outer ends connected with said pressure chambers, respectively.

5. A control coupling according to claim 4, wherein said control valve means comprises a valve spool axially movably installed in said accumulator chamber and exposed at an axial end to said accumulator chamber, said valve spool being movable between a first position where it closes said inner ends of said by-pass passages and a second position where it opens said inner ends of said by-pass passages.

6. A control coupling according to claim 5, wherein said control valve means further comprises a control oil pressure chamber which is supplied with pressurized oil and drained selectively, said valve spool being exposed at the other axial end to said control oil pressure chamber.

7. A control coupling according to claim 6, wherein said valve spool and said second rotary member have mating shoulders for holding said valve spool at said second position, said control valve further comprising a stopper abuttingly engageable with said valve spool and thereby holding said valve spool at said first position.

8. A control coupling according to claim 7, wherein said orifices are disposed between said respective inner ends of said discharge passages and said accumulator chamber.

9. A control coupling according to claim 8, further comprising regulator passage means for allowing flow of oil only in one direction form said accumulator chamber to said pressure chamber and thereby regulating oil pressure within said pressure chambers.

10. A rotational speed differential responsive type control coupling for an automotive limited slip differential unit, comprising:
   a housing provided to an end portion of one of first and second rotating shafts and having a cam surface at an inner periphery thereof;
   a rotor provided to the other of said rotating shafts to be surrounded by said housing and having a plurality of pistons held in contact with said cam surface and driven thereby to reciprocate radially of said rotor in response to a rotational speed differential between said housing and said rotor;
   said rotor further having pressure chambers defined by said pistons which are variable in volume in response to reciprocation of said pistons, and an accumulator chamber communicating with said pressure chambers for compensating increase and decrease of a quantity of oil within said pressure chambers;
   a plurality of discharge passages connecting said pressure chambers with said accumulator chamber for conducting oil discharged form said pressure chambers to said accumulator chamber;
   a plurality of orifices each fixed in size formed in said rotor and connecting one of said discharge passages and said accumulator chamber for restricting discharge of oil from said pressure chambers;
   a plurality of by-pass passages for by-passing said discharge passages, said by-pass passages being independent from said discharge passages and in parallel relation therewith; and
   valve means formed in said rotor for controlling opening and closing of said by-pass passages in such a manner that said by-pass passages are held closed under a normal vehicle 11. A rotational speed differential responsive type control coupling according to claim 10, wherein one of said certain vehicle running conditions is where an anti-lock braking system is put into operation.

12. A rotational speed differential responsive type control coupling according to claim 10, wherein one of said certain vehicle running conditions is where a vehicle is being braked with laterally opposed vehicle wheels being in contact with road surfaces of largely different frictional resistances.

13. A rotational speed differential responsive type control coupling according to claim 10, wherein one of said certain vehicle running conditions is where a vehicle is running at an extremely low atmospheric temperature.

* * * * *

UNITED STATES PATENT AND TRADEMARK OFFICE
CERTIFICATE OF CORRECTION

PATENT NO. : 5,162,024

DATED : November 10, 1992

INVENTOR(S) : Hiroshi YOSHIBA

It is certified that error appears in the above-identified patent and that said Letters Patent is hereby corrected as shown below:

COL. 6 line 21, Claim 1,    delete ";";

line 16, Claim 10,    after "vehicle" insert --running condition and held open under certain vehicle running conditions--.

Signed and Sealed this

Second Day of November, 1993

Attest:

BRUCE LEHMAN

*Attesting Officer*    *Commissioner of Patents and Trademarks*